April 25, 1967 A. BARLOW 3,316,452
CASES OF THE KIND FOR CONTAINING ELECTRICAL EQUIPMENT
Filed Oct. 5, 1965 3 Sheets-Sheet 1
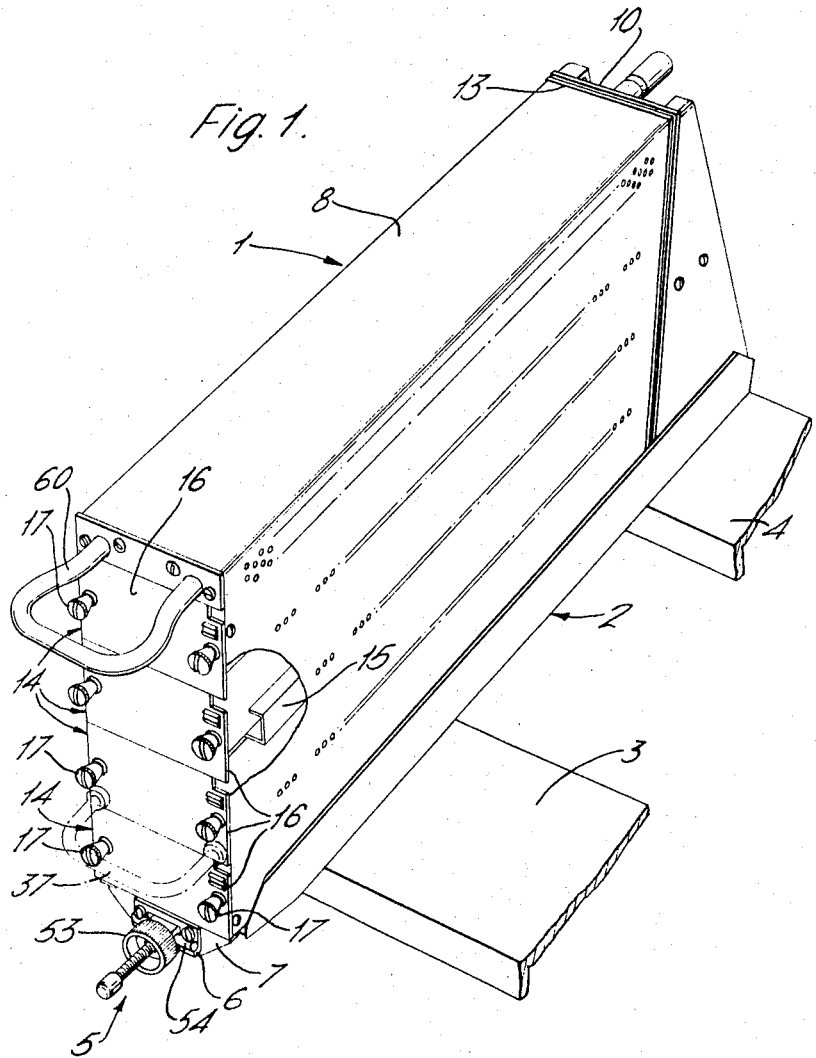
ALAN BARLOW - Inventor
Hall, Pollock & Vande Sande
Attorneys

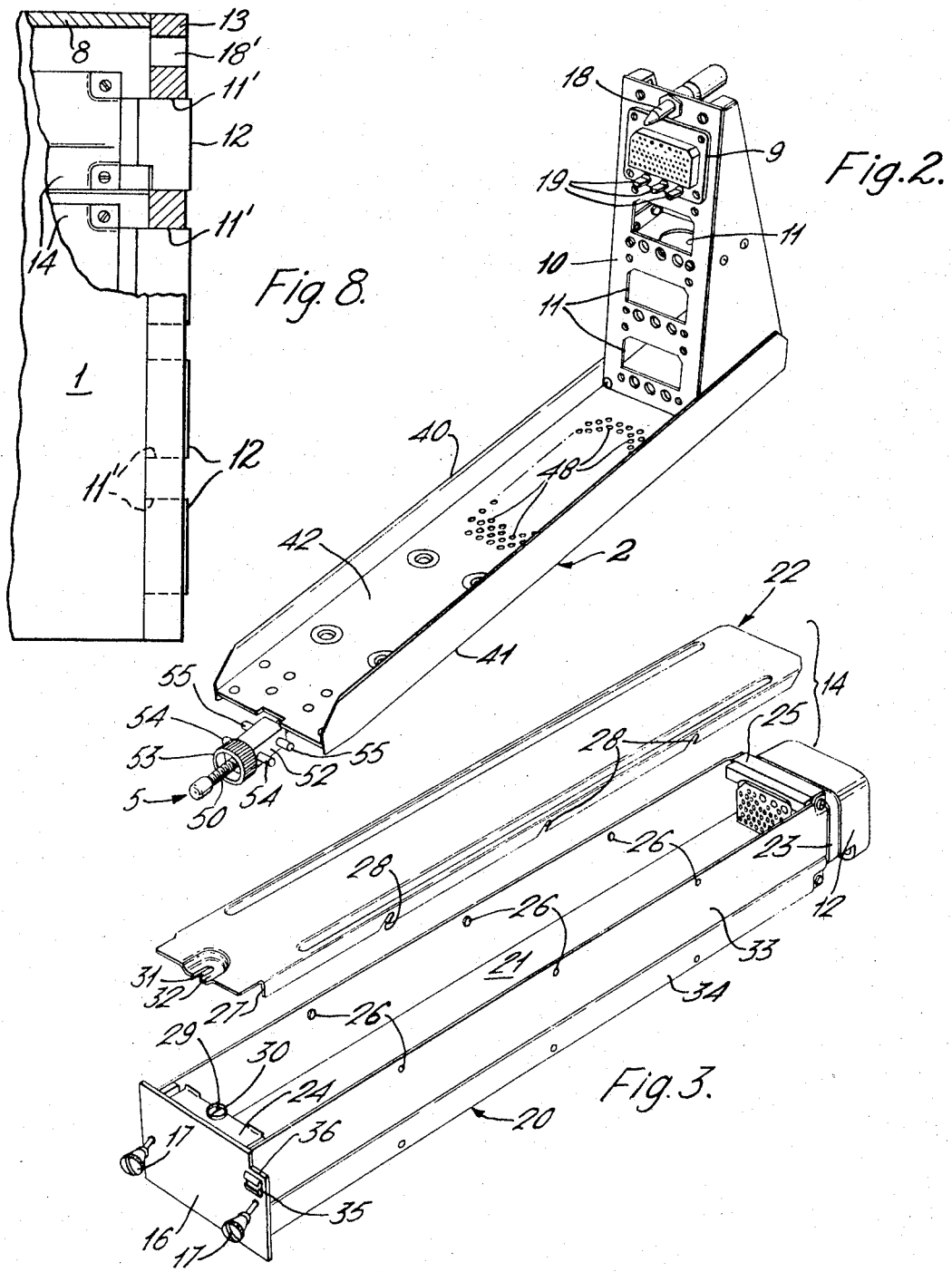

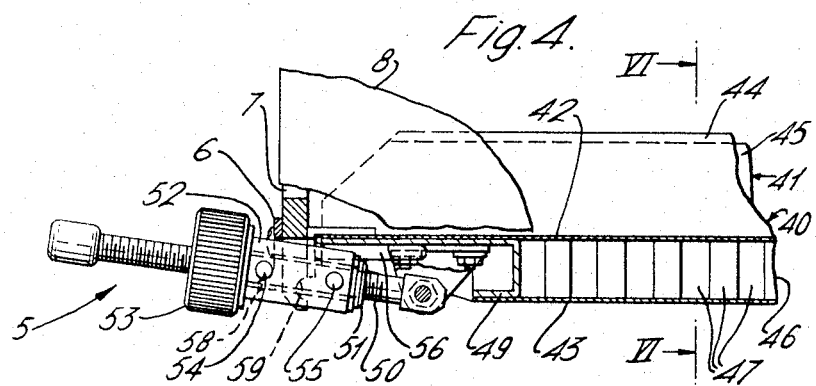
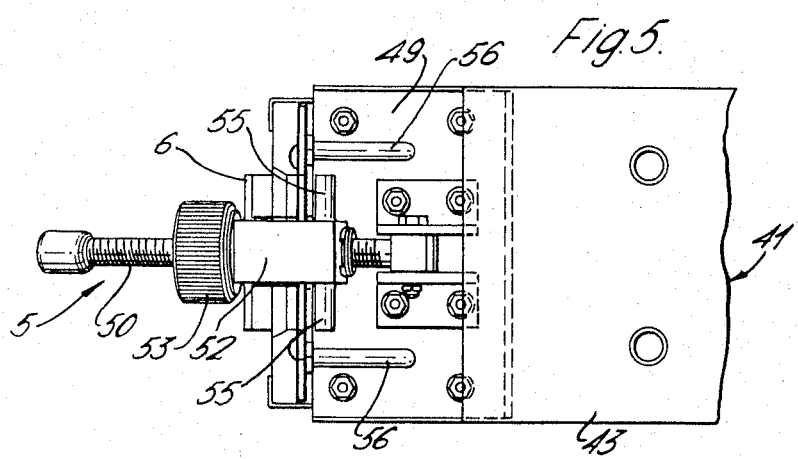
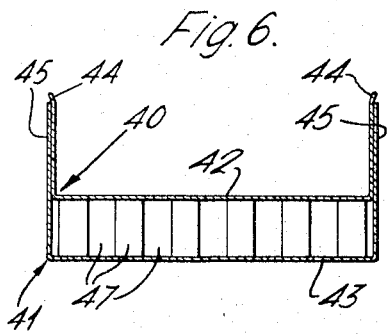
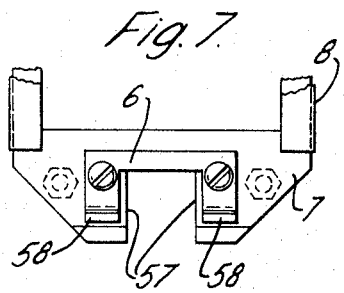
ALAN BARLOW - Inventor
Hall, Pollock & Vande Sande
Attorneys

United States Patent Office 3,316,452
Patented Apr. 25, 1967

3,316,452
CASES OF THE KIND FOR CONTAINING ELECTRICAL EQUIPMENT
Alan Barlow, Cheltenham, England, assignor to S. Smith & Sons (England) Limited, London, England, a British company
Filed Oct. 5, 1965, Ser. No. 493,057
Claims priority, application Great Britain, Oct. 12, 1964, 41,610/64
6 Claims. (Cl. 317—99)

This invention relates to cases of the kind for containing electrical equipment.

It is common practice to provide the different units of an electrical system in separate cases and to mount the cases containing the electrical equipment side-by-side on a support framework. This practice has particular advantage in the aeronautical field, and in this field has led to wide acceptance of a standard range of cases and of standard mounting arrangements, all with the object of minimising wastage of space and allowing for a certain degree of standardization in the support framework provided in aircraft. The standard, which is referred to by the letters ATR (standing for Air Transport Radio), specifies rectangular cases of a maximum height of 7⅝ inches and of a length which for "long" cases is some 19½ inches and for "short" cases in some 12½ inches. Various widths of case are specified, these being nominally expressed as fractions or multiples of a unit ATR-width of approximately ten inches, and typically the width of a ½ ATR case is five inches and the width of a ¼ ATR case just under 2¼ inches.

As a result of the reductions in size that have been achieved in electrical components in recent years, there is need for a form of case that, while conforming broadly to the existing ATR standards, allows for smaller packgaing of electrical equipment. It is one object of the present invention to provide a case that may be used to satisfy this need.

According to one aspect of the present invention a case for containing electrical equipment, comprises an outer body structure, and a plurality of elongated sub-cases that are adapted to slide into the outer body structure one above the other and to be releasably retained therein, at least one of said sub-cases itself comprising an elongated rectangular box-element that provides a compartment for containing part of said electrical equipment, and an elongated lid-element that is adapted to fit to the box-element for closing an open side of said compartment.

One of the two elements, that is to say either said box-element or said lid-element, may be provided with elongated slots, and the other of the two elements may have laterally-extending lugs that are adapted to engage the slots respectively for locating the lid-element on the box-element in the fitting relationship in which the lid-element closes the open side of said compartment. In these circumstances, the slots may extend in a direction that is inclined to the lengthwise direction of the said one element at a finite angle substantially less than ninety degrees, such that movement of the lid-element into and out of said fitting relationship is constrained to movement having a component lengthwise of the box-element.

The arrangement specified in the preceding paragraph for use where an elongated lid-element is adapted to fit to an elongated rectangular box-element, is applicable to cases for electrical equipment, generally, and not just to sub-cases of a combination of a plurality of sub-cases and an outer body structure as specified above. Thus, according to another aspect of the present invention, in a case or a sub-case for containing electrical equipment, an elongated lid-element is adapted to fit to an elongated rectangular box-element for closing an open side of the compartment which is provided by a box-element for continuing said equipment, and elongated slots, which are provided on one of the two elements and which are adapted to be engaged by respective laterally-extending lugs of the other element for locating the lid-element in the aforesaid fitting relationship, extend in a direction inclined to the lengthwise direction of said one element at a finite angle substantially less than ninety degrees such that movement of the lid-element into and out of said fitting relationship is constrained to movement having a component lengthwise of the box-element.

A case which includes a plurality of sub-cases and which is in accordance with both aspects of the present invention, will now be described, by way of example, with reference to the accompanying drawings in which:

FIGURE 1 is a perspective view of the case mounted by means of a tray individual to the case;

FIGURE 2 is a perspective view of the tray with the case removed;

FIGURE 3 is an exploded perspective view of one of four sub-cases of the case;

FIGURE 4 is a sectional side-elevation of part of the arrangement, illustrating the manner in which the case is locked to the tray by means of a device carried by the tray;

FIGURE 5 is a view from underneath corresponding to FIGURE 4;

FIGURE 6 is a section of the tray alone, taken on the line VI—VI of FIGURE 4;

FIGURE 7 is a front view of the lower part of a front panel of the case; and

FIGURE 8 is a sectional side elevation of the rear of the case.

Referring especially to FIGURES 1 and 2, a ¼ ATR case 1 containing electrical equipment is mounted in an aircraft by means of a tray 2 which is bolted directly at its base to cross-rails 3 and 4 that are supported in the aircraft by means of anti-vibration mountings (not shown). The case 1 is retained in the tray 2 by means of a locking and jacking device 5 which is attached to the tray 2 and which engages with a bracket 6 screwed to the front panel 7 of an outer body structure 8 of the case 1. Electrical connection is made to the electrical equipment carried by the case 1 via four two-part electrical connectors at the rear of the case 1 and tray 2. The female connectors 9 of these four connectors are carried by a junction panel 10 that is mounted on the tray 2 and extends to the full height of the case 1 (only one of the four connectors 9 is shown), each connector 9 being partially accommodated in a respective cut-out 11 of the panel 10. The four male connectors 12 each including a plug (shown in FIGURES 3 and 8) that mate with the connectors 9 project from the rear of the case 1 through cut-out 11′ (FIGURE 8) in a rear panel 13 of the structure 8.

The male connectors 12 are carried respectively by four sub-cases or modules 14 which together carry all the electrical equipment contained by the case 1, and which are supported one above the other by pairs of longitudinal runners 15 (only one runner 15 is shown in FIGURE 1) that are welded along the interior of the structure 8. The modules 14 slide along the runners 15 into the case 1 from the front, and when each is fully home lie substantially wholly within the structure 8 with the male connectors 12 projecting through the rear panel 13 and with a front plate 16 of each abutting the front panel 7 of the structure 8. Each module 14 is retained in place within the structure 8 by two screws 17 that are carried by the front plate 16 of the module and screw into the front panel 7.

A spring-loaded spigot 18 projects forwardly from the top of the junction panel 10, and co-operates with a socket 18' (FIGURE 8) in the rear panel 13 to ensure that the male connectors 12 are correctly aligned with the female connectors 9 when the case 1 is slid into place along the tray 2. Three indexing-pins 19 also project forwardly from each female connector 9 to engage with co-operating sockets in the mating male connector 12 and to ensure final, and individual, alignment with one another of the male and female connectors on the modules 14 and panel 10 respectively.

Referring now also to FIGURE 3, each of the four sub-cases or modules 14 comprises an elongated rectangular box-element 20 that provides a compartment 21 which is adapted to contain electrical equipment and which is closed on three sides only, and an elongated lid-element 22 that is adapted to fit to the box-element 20 and close the open fourth side of the compartment 21. The front plate 16, and a rear plate 23 carrying the male connector 12 of the module 14, close the two ends of the compartment 21 and provide shoulders 24 and 25 upon which to support the opposite ends of the lid-element 22. Three pairs of laterally-extending lugs 26 are provided at spaced positions along the length of the box-element 20, the two lugs 26 of each pair projecting inwardly towards one another from opposite sides of the compartment 21. The shank-portion of each lug 26 is terminated by an enlarged head-portion.

The lid-element 22 is of substantially planar form having down-turned longitudinal edges 27 that are a close fit within the box-element 20 and are provided with three pairs of elongated slots 28. The slots 28 are adapted to be engaged by the shank-portions of the lugs 26 and are inclined to the lengthwise direction of the element 22 at an angle of some forty-five degrees, such that when the lid-element 22 is brought down to close the compartment 21 the final closing movement, with the lugs 26 engaging the slots 28, is constrained to movement having, in addition to a downward component, a component lengthwise of the box-element 20. When the lid-element 22 is fully engaged with the box-element 20, it is retained in position by means of a screw 29. The screw 29, which is provided with a cup-washer 30, screws into the front shoulder 24, and, when the lid-element 22 is fully engaged, is screwed into the shoulder 24 with a slot 31, in a central depression 32 at the front end of the lid-element 22, inserted under the cup-washer 30 and the head of the screw 29. The lid-element 22 is in this manner clamped in place closing the compartment 21, removal of the lid-element 22 being restrained by the single screw 29 and the constraint imposed by the lugs 26 engaged with the slots 28.

The body of the box-element 20 between the front and rear plates 16 and 23 is formed by two channel-members 33 and 34 of rectangular U-shaped cross-section spot-welded back-to-back, the upper channel-member 33, having side-walls substantially longer than those of the lower channel-member 34, providing the compartment 21 for the electrical equipment. The front plate 16 carries a clip 35 for use in retaining an identification-tag (not shown) identifying in code the particular electrical equipment contained. Each of the four positions for the modules 14 in the case 1 is identified by the coded representation appropriate to the electrical equipment to be mounted at that position. The coded representation is provided on the front panel 7 (FIGURE 1) at the relevant position so as to be visible, when the appropriate module 14 is in place, through a corner cut-out 36 of the front plate 16 just above the identification clip 35 of the module.

Each sub-case or module 14 is easily withdrawn and inserted in the case 1 as required, withdrawal of the module simply involving unscrewing its screws 17 and then pulling it forwardly from the body structure 8 (thereby in this latter operation breaking the electrical connection to the module 14 and releasing it from the body structure 8), and insertion simply involving placing the module 14 on the appropriate pair of runners 15, pushing it backwardly as far as possible into the body 8, and then screwing up the screws 17 (thereby in this latter operation completing the establishment of electrical connection to the module 14 and securing it to the body structure 8). The modules 14 may each be provided with a handle (such as the handle 37 indicated in FIGURE 1 in broken outline on one module 14 only) to facilitate their withdrawal and insertion.

It is notable that the withdrawal and insertion of any module 14 does not involve any disturbance of the mounting of any other module 14 or of the mounting of the case 1 on the tray 2.

Referring in addition now to FIGURES 4 to 6, the tray 2 is provided in basic construction by two elongated and interfitting channel members 40 and 41 which are both substantially of rectangular U-shaped cross-section and which are formed of aluminium-alloy sheeting of 24 S.W.G. (Standard Wire Gauge). The member 40 fits closely within the member 41 with its base 42 spaced from the base 43 of the member 41 and with the upstanding sides 44 and 45 of the two members 40 and 41 in contact and welded together along their length. The space between the bases 42 and 43 is occupied by a substantially rigid honeycomb structure 46 constructed of aluminium-alloy strip and having its cells 47, of hexagonal cross-section, extending substantially normally from base 43 to base 42. The honeycomb structure 46 extends the whole length of the member 41, and, since each cell 47 is open at both ends, does not to any material extent restrict the passage of air through the thickness of the tray 2 between a series of perforations 48 (FIGURE 2) in the base 42 and a corresponding series of perforations in the base 43 of the member 41. These perforations 48 allow for the passage of air from beneath the tray 2 into the case 1 via similar perforations in the base of the case 1.

Referring especially to FIGURES 4 and 5, the two ends of the space between the members 40 and 41 are closed, closure of the front end, where the member 40 overhangs the member 41, being achieved by an aluminium bracket-piece 49. The bracket-piece 49 has pivoted to it a screwed shank 50 of the locking and jacking device 5. The device 5 also includes an internally-threaded sleeve 51 that is screwed on the shank 50, and a block 52 that is carried by the sleeve 51. The sleeve 51 is provided at its end remote from the bracket-piece 49 with a knurled finger-screw portion 53, and the block 52, which is rotatably mounted on the sleeve 51, has two pairs of pegs 54 and 55 projecting therefrom. The two pegs of each pair project in opposite directions to one another from opposite faces of the block 52, and are parallel to the pegs of the other pair.

When the case 1 has been slid into the tray 2 with its base in the guide-way provided by the member 40, with its rear panel 13 brought into initial engagement with the spigot 18, and with two rearwardly-projecting guide-pins 56 (FIGURES 4 and 5) that are carried by the front panel 7 engaged beneath the bracket 49 at the front of the tray 2, the shank 50 of the device 5 is pivoted upwards to the horizontal position in which the block 52 enters a co-operating slot 57 (FIGURE 7) in the lower end of the front panel 7. The position of the sleeve 51 on the shank 50 is adjusted as necessary by rotating the finger-screw portion 53 to bring the block 52 into the slot 57 with the pegs 54 and 55 to the front and rear respectively of the panel 7 (see FIGURES 4 and 5). The finger-screw portion 53 is now rotated to move the block 52 along the shank 50 and urge the pegs 54 against shoulders 58 that are provided on either side of the slot 57 by the bracket 6 carried by the panel 7. Further rotation of the finger-screw portion 53 in the same sense acts via the pegs 54 to force the case 1 backwardly along the tray 2 to the position in which the case 1 is fully engaged with the spigot 18, and the male connectors 12 carried by the case 1 are fully mated with the connectors 9. In this position, further backward movement is not possible and final tightening of the finger-screw portion 53 firmly locks the case 1 to the tray 2.

When the case 1 is locked to the tray 2 in this manner, it is held firmly to the rails 3 and 4, the rigidity of the mounting, and the good frequency-response characteristics it exhibits, owing much to the provision of the honeycomb structure 46. The honeycomb structure 46 provides stiffness without undue extra weight, and in this respect is well suited to airborne applications. The locking device 5 holds the case 1 firmly in the tray 2 against the high acceleration forces that are likely to be experienced in airborne applications.

When it is desired to remove the case 1 from the tray 2, the finger-screw portion 53 is rotated in the sense to release the pegs 54 from the bracket 6 and bring the pegs 55 to bear in a groove 59 (FIGURE 4) at the rear of the front panel 7. Further rotation of the finger-screw portion 53 in the same sense urges the case 1 forwardly along the tray 2 to break the engagement of the male and female connectors 12 and 9 respectively, at the rear of the case 1. The spring-loading of the spigot 18 helps in the disengagement, the socket which in the rear panel 13 receives the spigot 18 being of insufficient depth to accommodate its full length.

After disengagement of the case 1 from the connectors 9, the shank 50 is dropped downwards with the block 52 and pegs 55 released from the front panel 7. The case 1 may then be easily removed from the tray 2 using a handle 60 (FIGURE 1) provided at the top of the panel 7.

Although the invention has been described above more particularly in relation to a ¼ ATR case, the present invention is of wider application than this, being applicable to larger sizes of ATR case, and also even to cases that do not conform to the ATR standard.

I claim:

1. A case for containing electrical equipment, comprising a plurality of elongated sub-cases, an outer body structure having elongated slideways mounted one above the other for receiving the sub-cases within the outer body structure, and means releasably retaining the sub-cases on the slideways within the outer body structure with the sub-cases extending lengthwise along the slideways one above the other, the sub-cases each comprising an elongated rectangular box-element having three closed sides, an open side and closed ends to provide a compartment for containing part of the electrical equipment introduced through the open side, an elongated lid-element of substantially planar form that fits the box-element in a position to close the open side, and means releasably retaining the lid-element in said position.

2. A case for containing electrical equipment, comprising a plurality of elongated sub-cases, an outer body structure, slideways mounting the sub-cases one above the other within the outer body structure, and means releasably retaining the sub-cases on the slideways within the outer body structure, each said sub-case comprising an elongated rectangular box-element having three closed sides, an open side and closed ends to provide a rectangular compartment to receive electrical equipment through the open side, a plurality of lugs carried by said box-element and each projecting in a direction laterally across the compartment adjacent the open side, an electrical connector mounted at one end of the box-element for making electrical connection within the compartment, said connector projecting externally from the box-element at said one end, an elongated lid-element of substantially planar form for closing said open side of the compartment, said lid-element having along its longitudinal edges narrow down-turned portions that fit substantially wholly within the box-element at said open side, said down-turned portions having elongated slots therein that open from said edges to receive said lugs, and said slots being inclined to said edges at an angle substantially less than ninety degrees to constrain removal of the lid-element from said open side to movement having a component lengthwise of the box-element.

3. A case for containing electrical equipment, comprising a plurality of elongated sub-cases, an outer body structure of elongated form for housing the sub-cases one above the other, and means releasably retaining the sub-cases one above the other within the outer body structure, each sub-case including a rectangular box-element including a lid providing a compartment for containing a respective part of the electrical equipment, and an electrical connector comprising a plug carried by the box-element and projecting from a rear end of the box-element, and said outer body structure including a front panel apertured for receiving said sub-cases, an apertured rear panel spaced lengthwise of the body structure from the front panel, and means mounting the sub-cases one above the other extending lengthwise between the front and rear panels with the electrical connector of each box-element projecting through the apertured rear panel.

4. In combination, a case according to claim 3, a tray for mounting the case, said tray having a guideway for receiving the case, electrical connector means carried by the tray for mating individually with the connector of each sub-case, and means releasably retaining the case in the guideway with said connector means mated with the connector of each sub-case.

5. A case for containing electrical equipment, comprising an elongated rectangular box-element having three closed sides, an open side and closed ends to provide a rectangular compartment to receive electrical equipment through the open side, a plurality of lugs carried by said box-element and each projecting in a direction laterally across the compartment adjacent the open side, an electrical connector mounted at one end of the box-element for making electrical connection within the compartment, said connector projecting externally from the box-element at said one end, an elongated lid-element of substantially planar form for closing said open side of the compartment, said lid-element having along its longitudinal edges narrow down-turned portions that fit closely within the box-element at said open side, said down-turned portions having elongated slots therein that open from said edges to receive said lugs, and said slots being inclined to said edges at an angle substantially less than ninety degrees to constrain removal of the lid-element from said open side to movement having a component lengthwise of the box-element.

6. Apparatus for containing electrical equipment comprising, a plurality of sub-cases each including a rectangular box-element providing a compartment for containing a respective part of the electrical equipment and supporting an electrical connector projecting from an end thereof, an outer body structure of elongated form having apertured front and rear panels spaced lengthwise of the body structure from one another, said front panel apertured to receive said sub-cases, means mounting said sub-cases one above the other lengthwise between said front and rear panels with said electrical connector of each box-element comprising a plug projecting through an aperture in said rear panel, and a tray for mounting said outer body structure, said tray having a guideway for receiving said outer body structure and also supporting electrical connector means for mating with said connector of each sub-case, and means releasably retaining said outer body structure in the guideway with said connector means of said tray mated with the connector of each sub-case.

References Cited by the Examiner

UNITED STATES PATENTS

| | | | |
|---|---|---|---|
| 1,087,551 | 2/1914 | Reed | 292—300 |
| 2,602,842 | 7/1952 | Morris et al. | 174—52 |
| 3,257,496 | 6/1966 | Hamilton | 174—45 X |

ROBERT K. SCHAEFER, *Primary Examiner.*

M. GINSBURG, *Asssitant Examiner.*